United States Patent
Kumhyr et al.

(10) Patent No.: US 7,152,222 B2
(45) Date of Patent: Dec. 19, 2006

(54) METHOD AND SYSTEM FOR LOCALIZING JAVA™ JAR FILES

(75) Inventors: David Bruce Kumhyr, Austin, TX (US); Lorin Evan Ullmann, Austin, TX (US); Keiichi Yamamoto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/042,108

(22) Filed: Jan. 8, 2002

(65) Prior Publication Data

US 2003/0131320 A1    Jul. 10, 2003

(51) Int. Cl.
G06F 9/44 (2006.01)

(52) U.S. Cl. .................. 717/107; 717/108; 717/116

(58) Field of Classification Search ............. 717/107, 717/108, 114–118; 707/203–204
See application file for complete search history.

(56) References Cited

U.S. PATENT DOCUMENTS

| | | | |
|---|---|---|---|
| 6,286,051 B1 * | 9/2001 | Becker et al. ............... 709/236 |
| 6,427,229 B1 * | 7/2002 | Brobst et al. ............... 717/108 |
| 6,490,547 B1 * | 12/2002 | Atkin et al. ................... 704/8 |
| 6,523,169 B1 * | 2/2003 | Glunz ........................ 717/124 |
| 6,535,894 B1 * | 3/2003 | Schmidt et al. ............. 707/204 |
| 6,658,647 B1 * | 12/2003 | MacLeod et al. ........... 717/118 |
| 6,748,396 B1 * | 6/2004 | Klicnik et al. .......... 707/103 Y |
| 6,779,172 B1 * | 8/2004 | Weerawarana et al. ..... 717/115 |
| 6,839,712 B1 * | 1/2005 | Kumhyr et al. ............. 707/101 |
| 6,877,155 B1 * | 4/2005 | Lindsey ...................... 717/108 |
| 6,931,623 B1 * | 8/2005 | Vermeire et al. ........... 717/108 |

OTHER PUBLICATIONS

Corwin et al, "MJ a rational module system for Java and its applications", ACM OOPSLA, pp 241-254, 2003.*
Zaks et al., "Sealed calls in Java packages", ACM OOPSLA, pp 83-92, 2000.*
Pugh, "Compressing Java class files", ACM SIGPLAN, pp 247-258, 1999.*
Wijkman et al, "Tranparent Java standard extensions with native libraries on multiple platforms", ACM PPPJ, pp 41-43, 2003.*
Flanagan, *Java in a Nutshell*, Second Edition, May 1997, pp. 201-223, 535-541.
Sommerer, "The Java Archive (JAR) File Format", Java Developer Connection—java.sun.com, Sep. 1998.
O'Conner, "Java Internationalization: An Overview", Java Developer Connection—java.sun.com, Jul. 1998.

* cited by examiner

*Primary Examiner*—Anil Khatri

(57) ABSTRACT

A method, a system, an apparatus, and a computer program product are presented for facilitating the customization, translation, or localization of messages, strings, or other program resources to be used by a locale-sensitive version of a Java™ program stored in a Java™ JAR file. After opening the JAR file, text strings within a resource bundle for a first locale can be determined through a particular process for inspecting the resource bundle. A resource bundle for a second locale containing translated versions of the text strings can be created through various means and then stored into the modified JAR file.

24 Claims, 9 Drawing Sheets

FIG. 3

```
// Lunar calendars
{"HijriStandard",     "Um Al-Qura"},                          // Hijri calendar, Arabic numerals
{"HijriIndic",        "Um Al-Qura, Arabic-Indic digits"},     // Hijri calendar, Arabic numerals, English transliteration
{"HijriTransliterated", "Um Al-Qura, English transliteration"}, // Hijri calendar, Hindi numerals
{"ChineseLunar",      "Chinese Lunar"},                       // Chinese lunar calendar
                                                              // Astronomical calendaring
{"JulianDayNumber",   "Julian Day Number"},                   // Astronomical day number
                              304
       // Error messages      ↙
302 {{"ERR_NOT_HOLIDAY",  "Date not a holiday"},              // Error while parsing what is supposed to be a date
    {"ERR_NOT_DATE",     "Unparseable date"},                 // Error message for a raised 'IllegalArgumentException'
                                    306
    {"VALID_RANGE",  310  "Value is out of value range"},     // Error while parsing what is supposed to be a date
                                                              // Local class not compatible ⌐312
308 {{"CAL_PREFS_MISMATCH", "There is a mismatch between calendar preferences versions.
    Please find and delete the old file: %s"},  // Error message for a version mismatch with an older version of this software
    {"HOLIDAY_MISMATCH", "There is a mismatch between calendar holidays versions.  Please find and delete the old file: %s"},
                                                                                                                314
 ...
```

METHOD AND SYSTEM FOR LOCALIZING JAVA™ JAR FILES

CROSS-REFERENCE TO RELATED APPLICATIONS

The present application is related to the following application: U.S. application Ser. No. 09/848,170, filed May 3, 2001, titled "Method and System for Verifying Translation of Localized Messages for an Internationalized Application".

BACKGROUND OF THE INVENTION

1. Field of the Invention

The present invention relates to an improved data processing system and, in particular, to a method and apparatus for a software program development tool. Still more particularly, the present invention provides a method and apparatus for generating internationalized versions of application programs.

2. Description of Related Art

Development of a commercial software application requires significant time and effort. Upon completion, most enterprises desire to generate the largest possible amount of sales for the application, and many enterprises attempt to sell their applications in foreign markets. In order to do so, each application must be adapted in several different manners for different markets, regions, or countries. For example, a US version of an application would require English menus and dollars for the default currency symbol, while a French version of the application would require French menus and euros for the default currency symbol. Many tasks must be completed in order to localize an application for a particular locale. Dates, times, numbers, and currency values must be displayed in the customary format for the locale. In addition, the application must be able to operate with the local character encoding standard.

Adapting applications for local markets could entail costly and time-consuming modifications to the applications if not performed methodically. To facilitate the task of creating multiple versions of an application for international markets, many commercially available software development tools and runtime environments have been developed with the recognition that applications would need to be adapted to different human languages and other requirements prior to being sold in different regions or countries. The term "internationalization" is used to describe the process of enabling a software application to be used in multiple international markets.

A properly internationalized application comprises functionality that enables it to be used in multiple international markets with only a minimal amount of localization effort. For example, an operating system can allow a user to select locale parameters. Assuming that an application has been created while adhering to certain internationalization guidelines of the particular operating system, the presentation of information by the application can be dynamically adapted to the user's selected locale during runtime.

While certain localization tasks can be rather simple, other localization tasks require significant effort by the application developer. For example, each human language string that might be displayed to a user during the execution of the application must be translated. Switching between languages can be facilitated by the operating system or some other configuration mechanism, but different sets of strings must have been generated and stored beforehand in order to be available to be retrieved at some later time based on a configuration parameter.

An application developer might use a translation program to expedite the task of translating the human language text strings, but both human translators and translation programs may not translate all of the strings correctly or intelligibly. To guard against translation errors, an application developer would generally incorporate translation verification procedures into the overall quality control and testing procedures that are applied to the application that is being developed.

Checking the appearance or correctness of certain application items, such as menus and help files, is rather straightforward, but verifying other items can be relatively difficult. In particular, each error or warning message that might appear during the operation of the application must be verified.

During translation verification testing, a pervasive problem entails operating the application that is being tested in such a manner to display each message so that it may be verified. It is especially difficult to force error messages to be displayed because it is often difficult to generate the operating conditions that would cause the application to display an error message.

Rather than embedding, i.e., hard-coding, human language text within the source code of an application, application text strings, including warning and error messages, are often congregated within certain types of files that are subsequently associated with the application in the runtime environment, such as resource files. Hence, the translated strings that are required to localize an application may be located within one or more files, and these files can be viewed and edited using a typical editor by a person who is verifying the translated strings. If an erroneously translated string were to be found within one of these files, then the person performing the verification could merely edit the string to correct the error. On the other hand, a typical application could comprise thousands of strings and messages, and human scanning of one or more large text files can itself be an error-prone process such that the person performing the verification could easily miss errors within the file. Hence, it would be advantageous to have a software tool for facilitating translation verification of strings and messages that are used by a localized version of an application.

More specifically, the Java™ language and runtime environment has been widely used in application development and execution because of the efficiencies that are gained via Java's "write-once, run-anywhere" approach, and Java™ facilitates the congregation of localization resources via special classes called "resource bundles". By placing localizable elements within resource bundles, an application developer can separate user interface elements from locale-sensitive data, thereby simplifying the deployment of localized versions of applications.

Even though the localization of Java™ applications may have been simplified through the advent of resource bundles, the creation of localized versions of applications still requires some significant effort, and it may not be economically feasible to create localized versions for many languages and/or geographic regions, at least upon the initial release of an application. Moreover, a Java™ application may be easily transmitted or transported to a geographic region without being localized for the region. In other words, it is quite common to have a scenario in which a Java™ application is operated in a region in which it was not intended, particularly given the ease of disbursement of Java™ programs through the Internet and their execution on many different computing platforms.

Even if one has the desire to create a locale-sensitive version of a Java™ program, it may not be possible because the source files for the application may not be readily available. Java™ programs, especially applets, are commonly transmitted in the Java™ Archive (JAR) file format, which is a compressible, securable, file format that contains the bytecode class files and other files, e.g., image files, that are required to execute the program.

Therefore, it would be particularly advantageous to have a localization tool specifically for use in customizing Java™ JAR files.

SUMMARY OF THE INVENTION

A method, a system, an apparatus, and a computer program product are presented for facilitating the customization, translation, or localization of messages, strings, or other program resources to be used by a locale-sensitive version of a Java™ program stored in a Java™ JAR file. After opening the JAR file, text strings within a resource bundle for a first locale can be determined through a particular process for inspecting the resource bundle. A resource bundle for a second locale containing translated versions of the text strings can be created through various means and then stored into the modified JAR file.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 3 depicts a typical source file containing application messages/text strings;

DETAILED DESCRIPTION OF THE INVENTION

The present invention is directed to a system and a methodology for facilitating the creation of a localized Java™ JAR file. Java™ files and Java™ execution environments may be dispersed throughout a network. As background, a typical organization of hardware and software components within a distributed data processing system is described prior to describing the present invention in more detail.

Figure 1A:
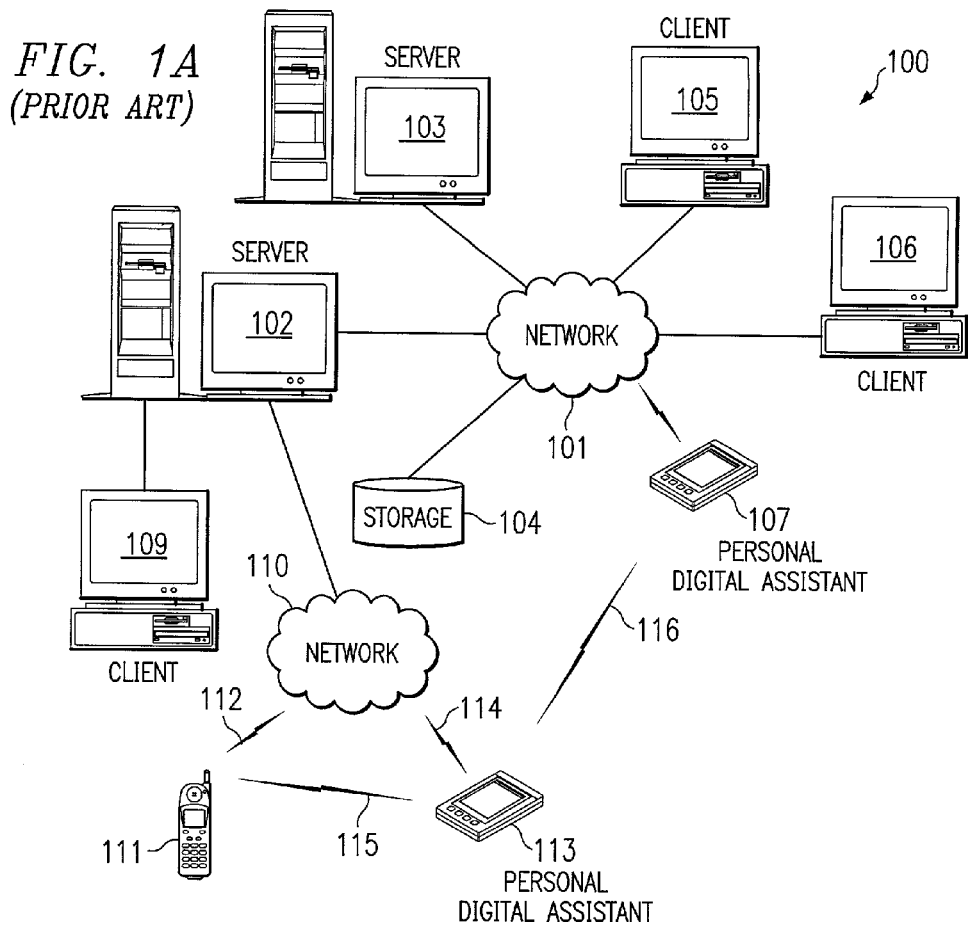
FIG. 1A depicts a typical distributed data processing system in which the present invention may be implemented.

With reference now to the figures, FIG. 1A depicts a typical network of data processing systems, each of which may contain and/or operate the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal-area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
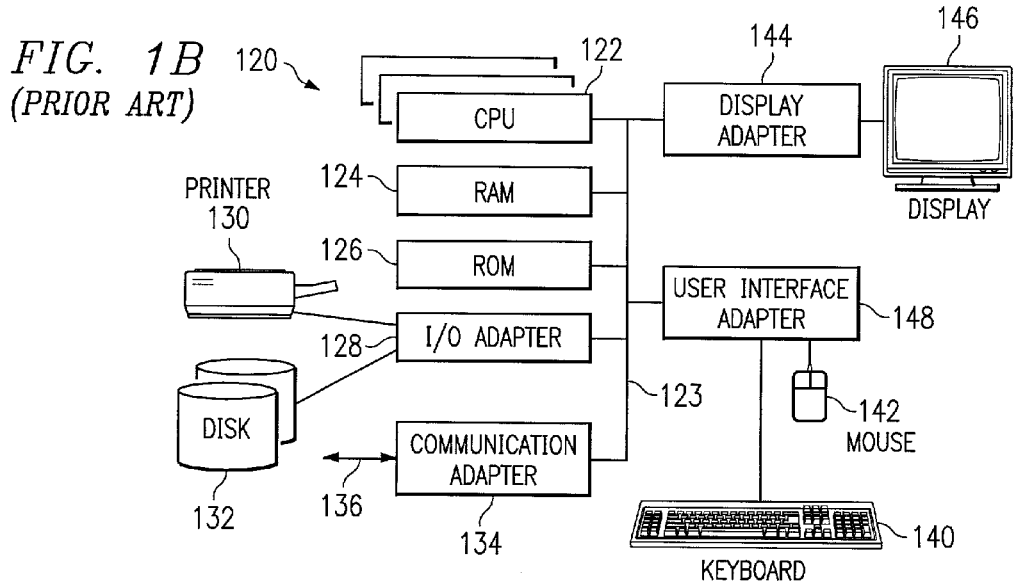
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, including a digital signal processor (DSP) and other types of special purpose processors, and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to a system and a methodology for creating and deploying a localized Java™ JAR file. FIGS. 2–5 depict a methodology for translation verification testing with respect to source files for an application program. However, the examples shown in FIGS. 2–5 assume that one has access to source files in order to modify these source files during localization processes and/or translation processes. After these source files are eventually used to generate a Java™ Archive (JAR) file, the source files may no longer be available to one who desires to localize the Java™ application contained within the Java™ JAR file. Hence, the localization of a Java™ JAR file in accordance with the present invention is shown in more detail with respect to FIGS. 7–8B.

Figure 2:
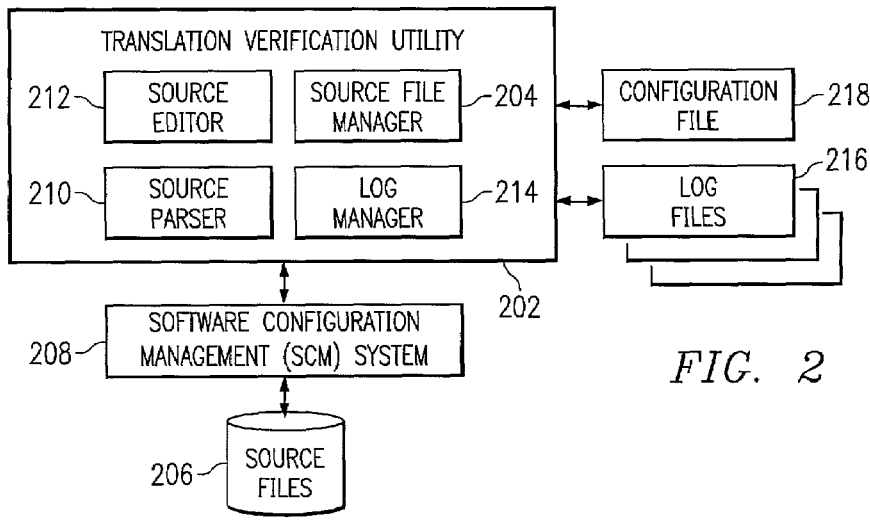
FIG. 2 is a block diagram depicting some of the logical components that may be used by a translation verification utility in accordance with a preferred embodiment of the present invention.

With reference now to FIG. 2, a block diagram depicts some of the logical components that may be used by a translation verification utility. Translation verification utility 202 may contain source file manager 204 for interacting with source files 206 via a software configuration management (SCM) system 208. In many application development environments, source files are often maintained within an SCM system. While initially developing source code modules and associated support files, such as resource files, a software engineer may locally edit and/or compile the source files and has the ability to add or delete files at will without regard to previous versions of those files. The translated messages or strings are stored within one or more source files, which may comprise a variety of file formats as required by a given application development system or runtime environment. Therefore, a source file may be any type of file from which a translated message or string may be retrieved for use by an application. While it may be good programming design to separate application source code from runtime data, a source file may comprise a combination of programming language source code, resource data, e.g., translated messages/strings, etc.

Translated messages may be considered a subset of translated strings in which translated messages are considered a relatively long, informational, text string for informing the user of an error, a warning, or some other type of information item, while a translated string may be a relatively short text string for use as menu items, labels, window titles, or some other application-related user interface item. Hence, with respect to the present invention, the terms "messages" and "strings" may be used interchangeably.

At some point in time, the software engineer determines that the source files meet various predetermined requirements, i.e., the source files appear to perform processing tasks as required without error. The software engineer then submits the source files to the SCM system, which archives the source files and/or manages the source files after that point in time. In summary, the SCM system provides structure and discipline to the modification of source files while an application is being developed.

A separate test engineer may then compile the newly submitted source files with source files from other software engineers to determine whether an application as a whole meets various processing requirements. If processing errors or bugs are found, the test engineer may issue a discrepancy report via the SCM system, and the original software engineer is notified to resolve the problem that is described within the discrepancy report.

In order to maintain the integrity of the overall application while it is being developed, the software engineer then retrieves a copy of the problematic source files via the SCM system, which controls and tracks the source files after their initial submission. The software engineer resolves the problem within the discrepancy report using the controlled copies of the source files, which probably requires modification of the source files. The software engineer then submits the modified copies of the source files to the SCM system. Using the newly modified source files, a test engineer may then rerun a test procedure to determine whether the prior problem within the discrepancy report has been resolved with respect to other source files from other software engineers. In this manner, the overall integrity of all of the source files that comprise the application that is being developed can be maintained.

In a similar manner, each source file that contains translated messages and strings can be managed by SCM system 208. Before a translation verifier may view and possible edit a source file, a copy of the source file is obtained via SCM system 208, which may place a lock on the source file to indicate that the source file is already in use. During the verification process, the source file may be modified. After the translation verification is complete, a modified copy of the source file may be archived via SCM system 208. Otherwise, if no modified copy is generated and the verifier has completed the verification process with respect to a particular source file, the translation verification utility can notify SCM system 208 to release the lock on the source file.

Hence, translation verification utility 202 can interoperate with various SCM system or subsystems as required to manage the source files and maintain the integrity of the application as it is being developed. Source file manager component 204 interfaces with SCM system 208 to retrieve and store source files as necessary. Alternatively, if an application is being developed without the assistance of an SCM system, source file manager component 204 may directly retrieve, modify, and store files for translation verification utility 202 as necessary.

Source parser component 210 contains rules for parsing the source files that contain translated strings and messages to be verified. The source files may be formatted in a variety of ways, and the parser may scan, retrieve, and store information within the source files in an appropriate manner.

As noted above, an application typically does not contain hard-coded messages but instead gets the message during runtime in accordance with a locale parameter. For example, Java™ provides a mechanism for defining messages as key/value pairs within a "ResourceBundle" subclass, and an application developer can create a "ResourceBundle" for each language or locale that is supported by the application; at runtime, an appropriate method can be used to load the "ResourceBundle" for the current locale. In other words, Java™ facilitates the congregation of localization resources via special classes called resource bundles. Each message or string is associated with a key that serves as the message/string name, and the application retrieves a locale-dependent message or string using the locale-independent message or string name. For a Java™ application, source parser 210 would support interfacing with "ResourceBundles" as required.

Source editor 212 obtains translated strings or messages in a sequential manner for presentation to a user who is performing the translation verification. Source editor 212 employs a graphical user interface that allows the user to edit message or other strings to correct erroneous translations.

Log manager 214 generates logging information that may be stored within log files 216. As the translation verifier views and possibly edits the translated messages and strings, the translation verification utility may be optionally configured to track the actions of the user. When a message or string is verified or edited, log manager 214 generates a record of the action and the identity of the user who has performed the action. If errors within the translated messages or strings are detected at some later time, then the logs may be checked to identify how or when the erroneous message was incorrectly verified during the translation verification process. Log files 216 may optionally be incorporated as part of the controlled files associated with an application through SCM system 208.

Translation verification utility 202 may use configuration file 218 for storing configuration parameters that determine the manner in which the translation verification utility operates. Configuration file 218 may also contain user preference parameters.

With reference now to FIG. 3, a typical source file that contains application messages is shown. An example of a resource file or a resource bundle contains a set of messages and associated identifiers. Message 302 comprises message key 304 and message text string 306, which contains the word "date". For the given context of a calendar application, the word "date" could be correctly translated into a foreign language with the meaning "day on which an event occurs" but could also be incorrectly translated with the meaning "edible fruit of a palm tree". Message 308 comprises message key 310 and error text string 312, which contains a variable string identified by the "% s" substring that allows a value for the substring to be dynamically provided during execution of the application. Comment 314 is associated with message 308 and provides further information about the particular message.

Figure 4A:
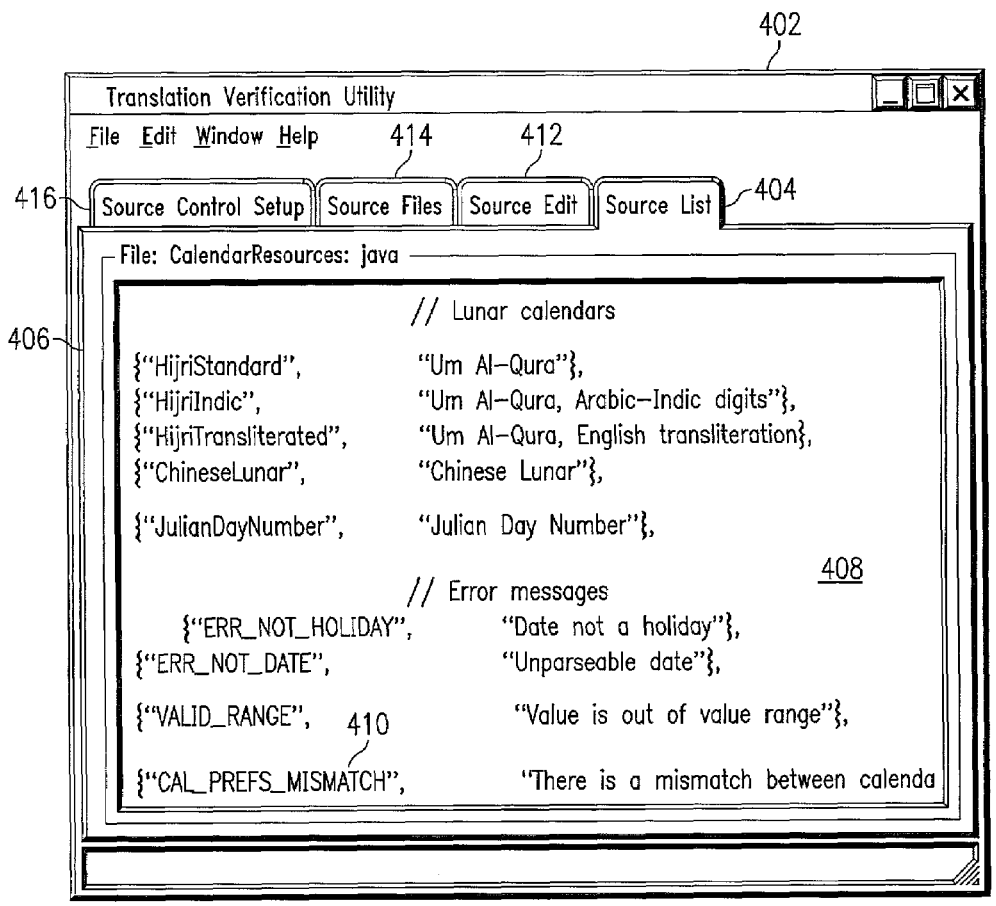
FIGS. 4A–4B depict a set of graphical user interface (GUI) windows in which a user may interact with the translation verification utility of the present invention.
Figure 4B:
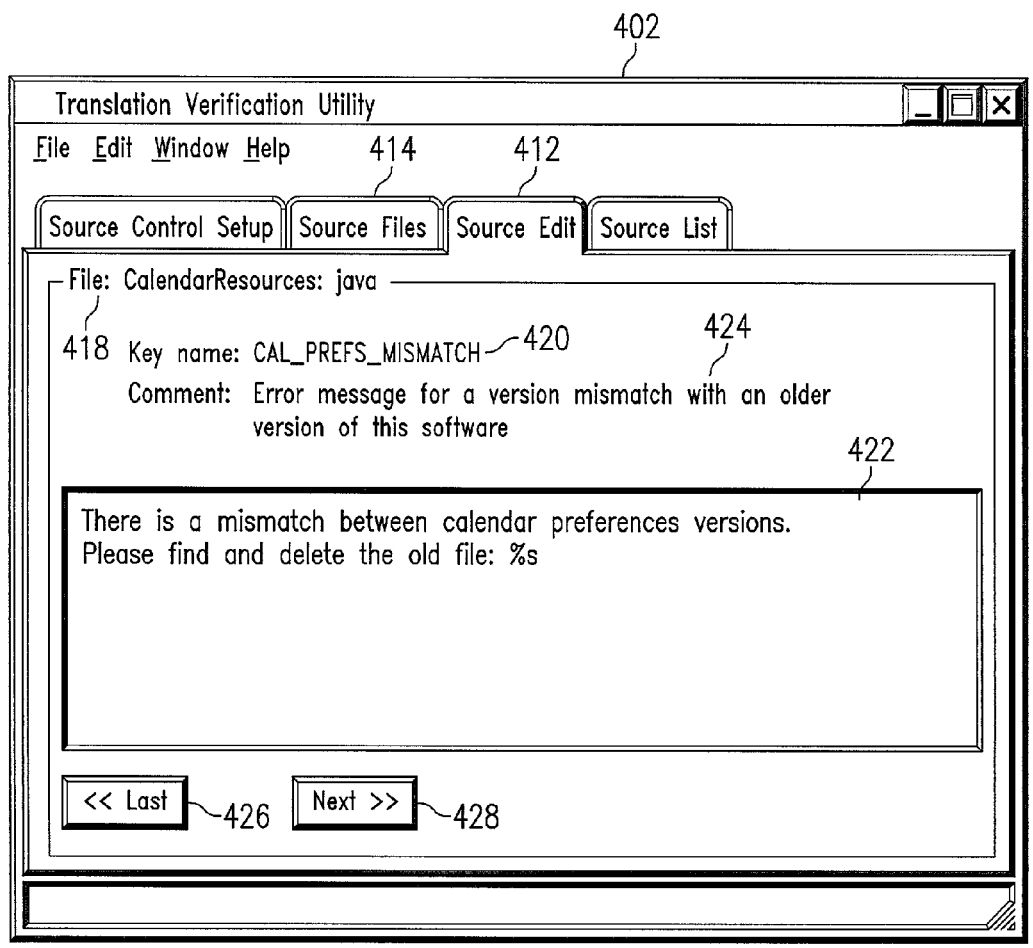

With reference now to FIGS. 4A–4B, a set of graphical user interface (GUI) windows depict a manner in which a user may interact with a translation verification utility. FIG. 4A shows window 402 for a translation verification utility. Tab 404 allows a user to select a subwindow that shows a listing of the content within the current source file that is being verified by a user. Label 406 provides the name of the current file, and content area 408 displays the actual content from the current source file. For example, message 410 is similar to message 308 shown in FIG. 3. Tab 412 allows a user to select a subwindow that enables the user to edit the text strings and messages from a source file in a methodical, sequential manner, as described below with respect to FIG. 4B.

Tab 414 allows a user to select a subwindow that enables the user to identify a set of source files to be used as input to the translation verification process. Referring again to FIG. 2, translation verification utility 202 contains source file manager 204 for managing the source files. The user of the translation verification utility may interface with a software configuration management system via a source file manager through the GUI presented by tab 414. Alternatively, the user of the translation verification utility inputs and/or selects, through the GUI, files to be controlled directly by the source file manager.

Tab 416 allows a user to select a subwindow that enables the user to enter configuration parameters to be used by the translation verification utility. Specifically, in additional to other types of configuration parameters, a particular user may request to review only those files associated with localizing the application for a particular locale. For example, the user may request to review only those files that contain messages or strings that have been translated into French, whereas another user may review those files that contain messages or strings that have been translated into Arabic.

Referring to FIG. 4B, window 402 is shown after a user has selected tab 412. Label 418 again shows the name of the source file that is currently open. A source file contains a series or sequence of translated messages or text strings. Using its knowledge of the type and structure of the current source file, the translation verification utility steps through the message or text strings within the source file by displaying the translated messages or text strings in solitary manner. If more than one source file has been identified by the user, e.g., through the GUI presented by tab 414, then the translation verification utility will open those files in an appropriate order for subsequent verification of their translated messages by the user.

Key name 420 is the key or identifier that is associated with the message that is currently being shown within message area 422. The user of the translation verification utility can view the message, and if the message contains a translation error, the user can edit the message within message area 422 to correct the error. Message area 422 contains only one message or text string at a time. When another message or text string is retrieved from a source file, the newly retrieved item replaces the currently viewed item, thereby resetting the display to focus on the newly retrieved item. It should be noted that the retrieval or storage of text strings to the source file may be supplemented with the use of caches or other data structures such that retrieval or storage may be performed indirectly.

Comment text 424 is the comment text that is associated with the message within message area 422. Depending on the structure of the message file, the source parser within the translation verification utility can retrieve a comment or other information that is associated with the message and display the associated information in a read-only manner. In this manner, the verifier is provided with context information that assists the verifier in a decision as to whether the message or other text string appears to have been translated correctly.

"LAST" button 426 allows the verifying user to return to the previously viewed text string or a text string that logically proceeds, in some manner, the currently viewed text string within a source file (or the previous source file if there are multiple source files being used). "NEXT" button 428 allows the verifying user to proceed to the translated message or text string that logically follows, in some manner, the currently viewed text string within a source file (or the next source file if there are multiple source files being used). By using these buttons, the verifying user can step or "walk" through the translated messages or strings, which are displayed in a solitary manner in response to the user's requested actions; only one message or text string is displayed at a time to the user. When a user selects button 426, button 428 or a similar type of control, the display that is presented by the translation verification utility changes such that the user can view a text string from the source file that is different from the text string that was being viewed prior to the user selecting the control; the switch between text strings is done automatically without further input from the user.

Alternatively, a variety of "movement" controls could be provided to the user to select a particular text string to be viewed. For example, the user could use a "VERIFIED" button to positively indicate that the translated text string has been verified; in this case, using the "LAST" or "NEXT" button may merely move the current focus to another translated text string without recording that the translated text string has been verified. This arrangement of controls would be useful for allowing the verifying user to scan translated messages without making a verification determination, thereby allowing the user to skip some messages that may require more effort. Other buttons could be provided to the user, such as a "SAVE" button or a "CANCEL" button, to allow the user to control whether or not changes to a text string should be saved after a user has made any changes to the text string with message area 422.

As the messages or strings are shown to the user and possibly edited by the user, the translation verification utility may log information concerning the identity of the verifying user, the date and time at which a translated string or file was verified, and whether the user modified a particular translated text string. In this manner, quality control may be performed to ensure that mistakes within the translation process and the translation verification process are minimized.

Other information associated with the source file or a particular text string could shown to the user. For example, the translation verification utility could display the number of messages that have been reviewed by the user from a particular source file and the number of messages that are left to be reviewed by the user within the source file. Assuming that the utility may be tracking the user's actions for logging purposes, as the user moves logically forward or backward through the source file, the translation verification utility could display an indicator to the user as to whether the user has previously viewed a particular message. These types of features could be especially beneficial during the development of a large application because the user may not review all messages in a single session but may require several sessions to review all of the translated messages for the application that is being developed. Moreover, multiple users could verify different sets of translated messages for an application.

Given that the review of the translated messages for an application under development might involve multiple users over multiple sessions, other review controls could be provided to allow the users to move through the messages according to the tracking/logging information that is generated by the translation verification utility. By scanning past logs, the utility could determine which messages have not yet been reviewed, either completely unreviewed or partially unreviewed by a particular user, and the utility could then present those messages to the user. Hence, the review controls could include the ability for a verifying user to review subsets of messages within the source files that are associated with a particular application. Moreover, the utility could also determine whether or not all messages had been verified, thereby allowing a test engineer to determine whether or not the source files with the translated messages were ready for inclusion within a final, commercially-ready version of the application.

Figure 5:
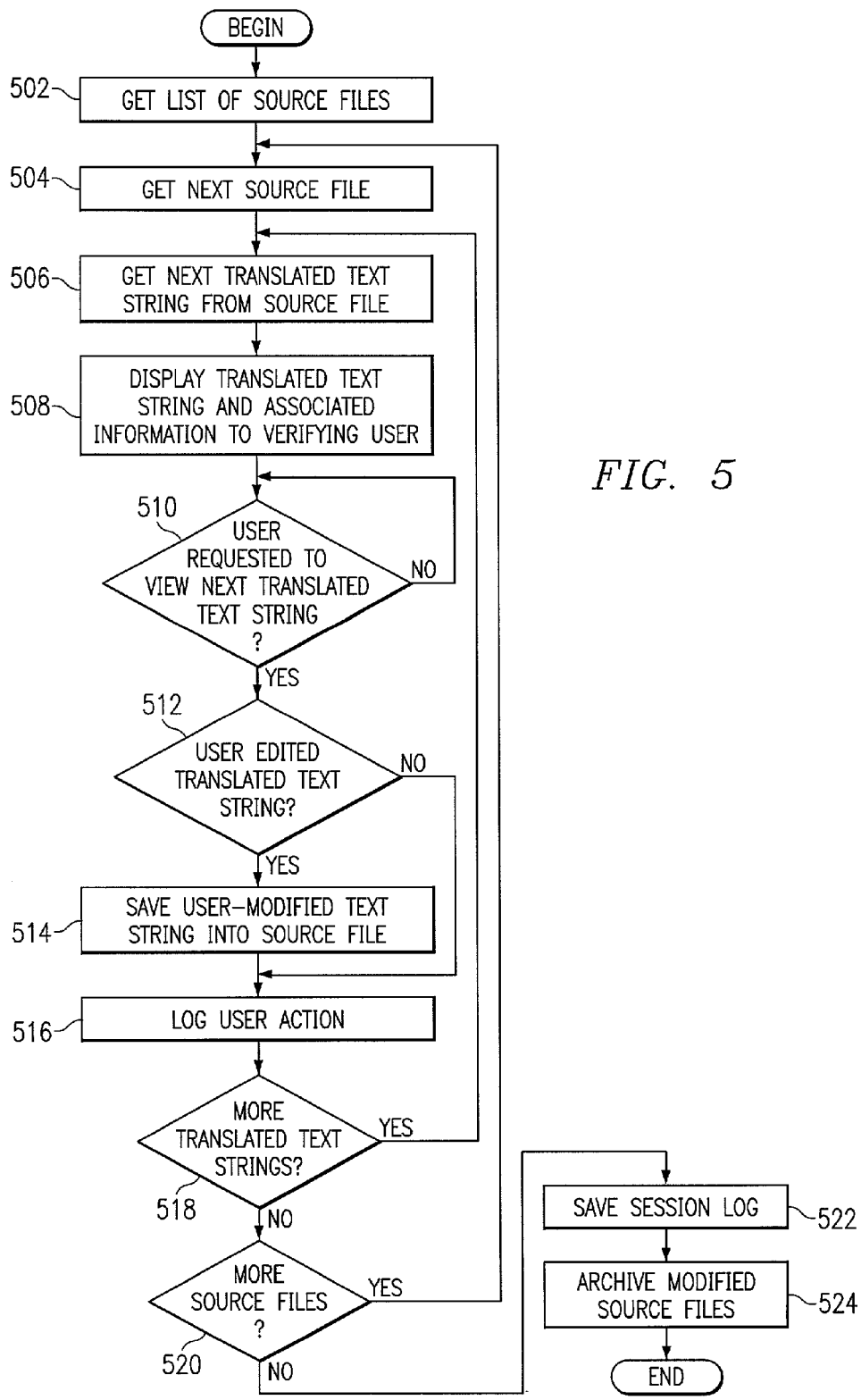
FIG. 5 is a flowchart depicting a process through which the translation verification utility enables a user to verify translated messages and strings within source files in accordance with a preferred embodiment of the present invention.

With reference now to FIG. 5, a flowchart depicts a process through which the translation verification utility enables a user to verify translated messages and strings within source files. It should be noted that the process depicted in the flowchart in FIG. 5 assumes that the verifying user continues to move forward sequentially through the messages or text strings within the one or more source files; one of ordinary skill in the art would understand that the translation verification utility would be able to move forward and backward through the items to be displayed to the user in a variety of manner as described above with respect to FIG. 4B.

The process begins with a retrieval of a list of source files (step 502). The list of one or more source files may be originated in a variety of ways: the list of source files could be selected or entered by the user; the translation verification utility could be configured to search for appropriate source files associated with a specified application; the translation verification utility could interface with a software configuration management system to obtain a list of source files; and/or some other equivalent methodology for determining a set of files that are associated with a particular application.

A source file that is identified within the list of source files is retrieved (step 504). A translated text string and any associated information, such as a comment and its key, are retrieved from the source file (step 506) and displayed to the verifying user (step 508). The user may edit the translated text string to correct an incorrectly translated string or message or may request to view the next message. A determination is made as to whether the user has requested to view the next message (step 510); if not, then the translation verification utility cycles in a wait loop for the next user action.

If the user has requested to view the next message, then a determination is made as to whether the user has edited the translated text string (step 512). If so, then the modified text string is saved into the source file or a copy of the source file, as appropriate (step 514). If the user has not modified the text string, then the process does not save the modified text string. In either case, the translation verification utility could log the user's action, including an indication of whether the translated text string was edited, verified, skipped, etc. (step 516).

A determination is then made as to whether there are more translated text strings to be verified within the current source file (step 518). If so, then the process branches back to step 506 to obtain and process another translated text string. Otherwise, the process continues by determining whether there is another source file with translated text strings that have not yet been verified (step 520). If so, then the process branches back to step 504 to get another source file from the list of source files. Otherwise, the translation verification utility may save a log of the current session (step 522), if necessary or appropriate, and then archive or store any modified source files (step 524). The process of stepping through a set of translated text strings using a translation verification utility is then complete.

Figure 6:
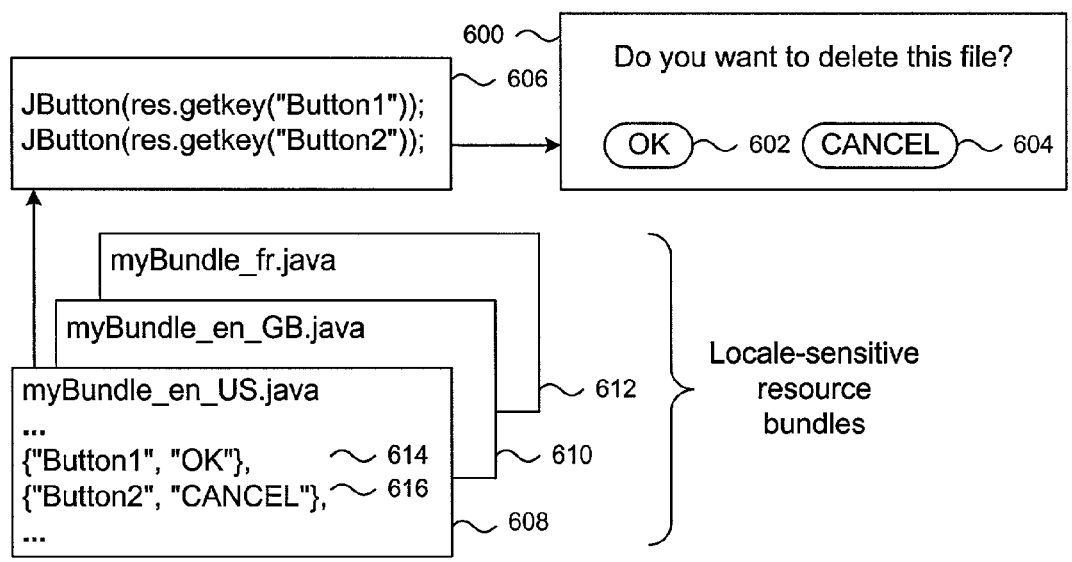
FIG. 6 is a block diagram depicting a Java™ resource bundle that is used to contain locale-sensitive text strings for a graphical user interface.

With reference now to FIG. 6, a block diagram depicts a Java™ resource bundle that is used to contain locale-sensitive text strings for a graphical user interface. Window 600 is a simple dialog box with a user-action confirmation message and two buttons, "OK" button 602 and "CANCEL" button 604. Java™ "Jbutton" calls 606 within a Java™ applet or application are used to create the buttons. Each "Jbutton" call references a key within a resource bundle, which contains key-value (name-value) pairs. A previously determined locale parameter selects one of multiple resource bundles 608–612; the required key is located within the resource bundle that is in use, which is resource bundle 608 in this example. Key-value pair 614 provides the "OK" string that appears in button 602, while key-value pair 616 provides the "CANCEL" string that appears in button 604. Resource bundle 608 contains an English-language resource bundle for the USA locale; resource bundle 610 contains an English-language resource bundle the Great Britain locale; and resource bundle 612 contains a French resource bundle for no specific locale.

FIGS. 2–5 depict a methodology for a set of translation, localization, and/or translation verification testing processes with respect to source files. As noted above with respect to FIG. 2, the source files could include files for Java™ resource bundles. FIG. 6 shows an example of using a resource bundle during execution.

However, as noted above, even if one has the desire to create a locale-sensitive version of a Java™ program, it may not be possible to create the desired version because the source files for the application are not readily available. Java™ programs, especially applets, are commonly transmitted in the Java™ Archive (JAR) file format, which is a compressible, securable, file format that contains the bytecode class files and other files, e.g., image files that are presented within a GUI, that are required during execution of the program.

The present invention provides a methodology for customizing, localizing, or internationalizing a Java™ JAR file by recognizing that the resource bundles that are embedded within Java™ JAR files can be inspected to extract the information that is required to be modified for a localized version of the Java™ JAR file. After localizing an extracted resource bundle, the customized version of the resource bundle can be inserted back into a modified JAR file. The present invention is depicted in more detail with respect to the remaining figures.

Figure 7:
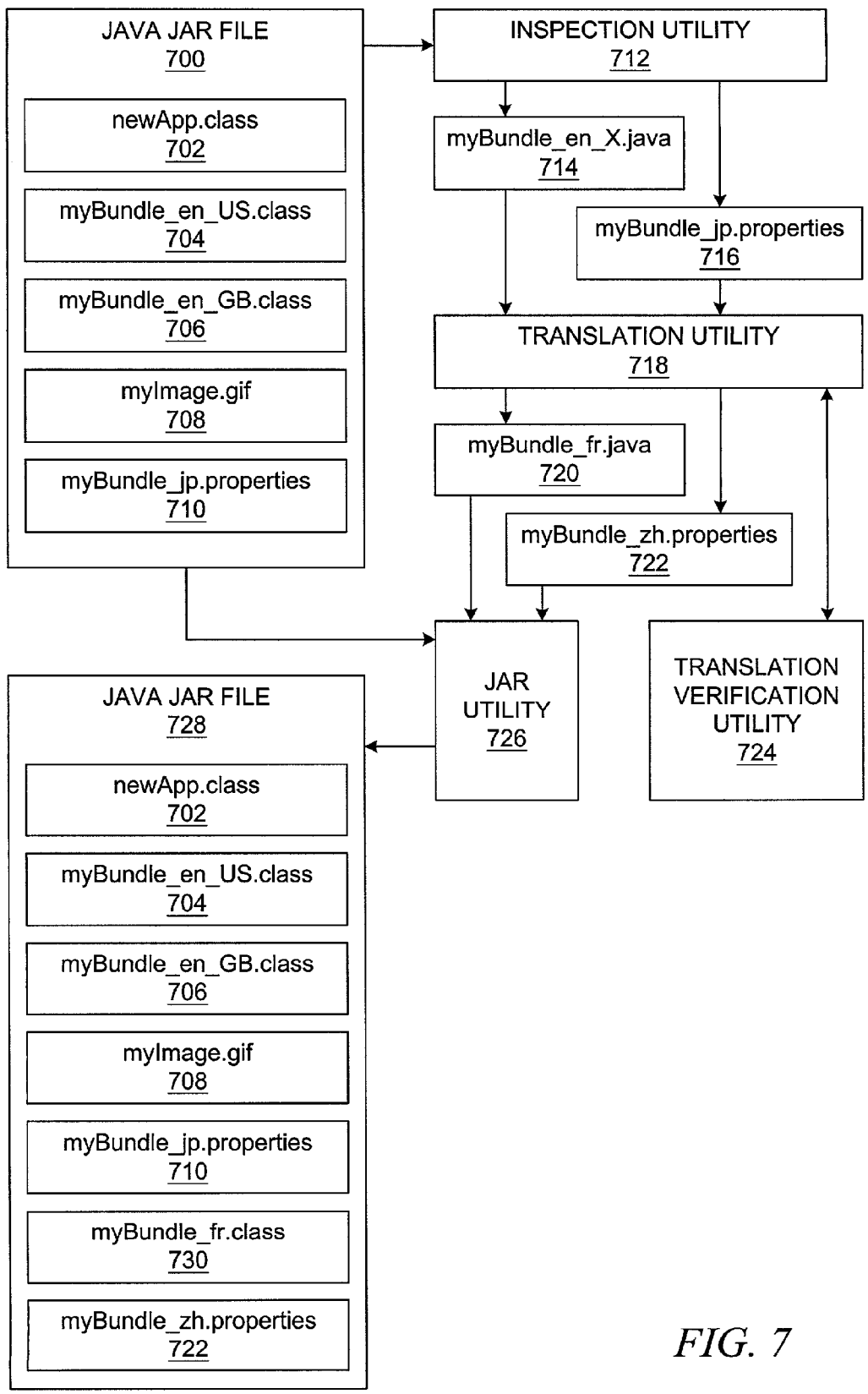
FIG. 7 is a block diagram depicting an inspection utility that may be used in a process to create localized versions of a resource bundle in accordance with an embodiment of the present invention.

With reference now to FIG. 7, a block diagram depicts an inspection utility that may be used in a process to create localized versions of a resource bundle in accordance with an embodiment of the present invention. Java™ JAR file 700 contains class files 702–706 and image file 708 for an applet or application. Java™ JAR file 700 also contains ".properties" file 710. A manifest file (not shown) is typically included in a JAR file, and the manifest file typically includes a message digest for each file in the JAR file to ensure that the file has not been corrupted since the JAR file was created.

Java™ supports two forms of resource bundles. A "ListResourceBundle" class can be used in the source code that is stored within a ".java" file, which is subsequently compiled into a ".class" file. A "PropertyResourceBundle" class reads a ".properties" file from a specified input stream and implements the ResourceBundle API for looking up named resources from the resulting Properties object. A properties file comprises lines of the form "name=value", i.e., "key=value" pair, in which each line defines a named property with the specified string value. Although one can instantiate a "PropertyResourceBundle" class, it is more common to simply define a ".properties" file and then allow the "ResourceBundle.getBundle( )" method to look up the file and return the necessary "PropertyResourceBundle" object.

Since the ".properties" file is a plain text file, only text strings are allowed as values, whereas the "ListResourceBundle" class allows non-string objects, e.g. icons or bitmaps, as well as string objects as values. The "PropertyResourceBundle" class is replaceable with the "ListResourceBundle" class if only string objects are defined as values. In fact, once loaded with the "ResourceBundle.getBundle( )" method, the two forms of resource bundle are not distinguishable. A typical Java™ application's JAR file may contain a list resource bundle, a property resource bundle, or both.

Inspection utility 712 loads JAR file 700 and obtains a list of classes that are resource bundles, as explained in more detail further below. In this example, inspection utility 712 generates output file 714 that represents a copy of one of the "ListResourceBundle"-type of resource bundles within the JAR file, such as class file 704. In addition, inspection utility 712 also generates output file 716 that represents a copy of the single "PropertiesResourceBundle"-type of resource bundle within the JAR file, i.e., ".properties" file 710. Alternatively, a copy of each of the resource bundles could be generated.

At this point, files 714 and 716 can be manipulated as source files as described above with respect to FIGS. 2–5. Translation utility 718 can guide a translator to step through the strings that require translation. For example, a translator may view the English-language strings in file 714 and then type in French-language translations of those strings, after which the translation utility generates a French-language resource bundle in file 720. In this case, the translation utility understands the standard naming-convention rules for the names of resource bundles. Alternatively, the translator could manually edit English-language file 714 to create French-language file 720 and then subsequently rename the files in accordance with the naming convention rules. Similarly, translator may view the Japanese-language strings in file 716 and then type in Chinese-language translations of those strings, after which the translation utility stores the Chinese-language strings in file 722. In any case, translation verification utility 724 can be used to verify and to correct the translated strings in files 720 and/or 722, either in conjunction with the operation of translation utility 718 or operated separately using files 720 and/or 722 as input.

After files 720 and 722 have been generated and verified, file 720 can be compiled from a ".java" file into a ".class" file, and JAR utility 726 is then used to insert the French-language resource bundle in ".class" file 730 and the Chinese-language resource bundle in file 722 into modified JAR file 728. JAR utility 720 is a standard JAR file creation utility that is able to create JAR files, modify their contents, view their contents, etc., in a well-known manner. In an alternative embodiment, the inspection utility, translation utility, and JAR utility could be combined into a single utility that extracts a resource bundle from JAR file 700 and then generates JAR file 728, as described with respect to FIGS. 8A–8B.

It should also be noted that the examples provided herein describe the translation of strings from one language to another, but more generally, the processes may include the mere modification of a string, e.g., merely editing a string within a single language in order to use a term that is more appropriate for a particular locale or region. For example, slight differences in terminology exist for English in the USA versus Great Britain.

Figure 8A:
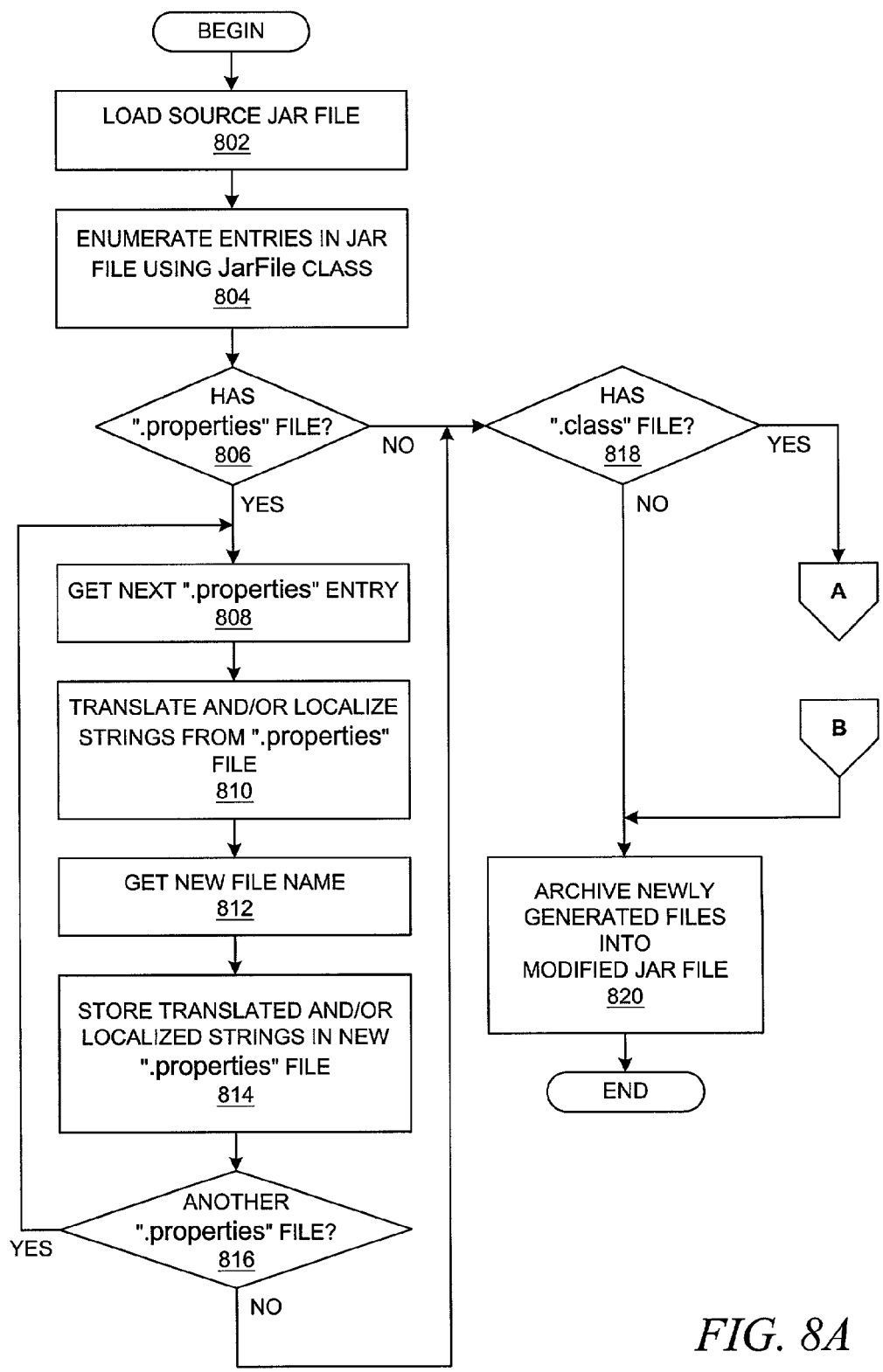
FIGS. 8A–8B are a pair of flowcharts depicting a process for localizing a resource bundle from a JAR file.
Figure 8B:
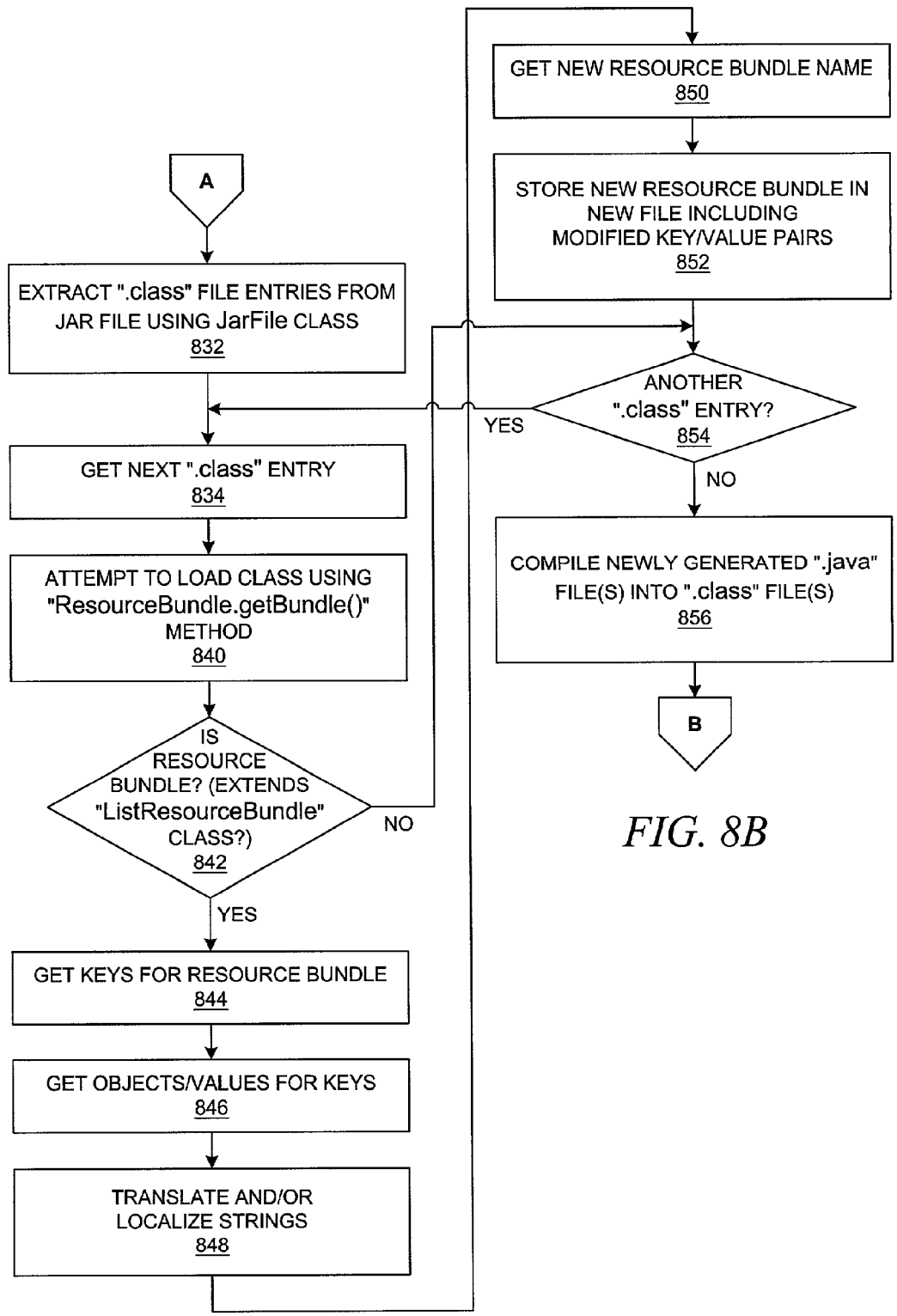

With reference now to FIGS. 8A–8B, a pair of flowcharts depicts a process for localizing a resource bundle within a JAR file in accordance with the present invention. In this example, it is assumed that a JAR file has at least one resource bundle, and it is assumed that a user chooses to modify at least one resource bundle to create a new resource bundle. Moreover, the example assumes that all resource bundles that are present in a JAR file are translated/localized; alternatively, a user may be provided with an option to choose the resource bundles that should be processed.

Referring to FIG. 8A, the process begins when an inspection utility, such as that described above with respect to FIG. 7, loads a JAR file (step 802) and then uses the "JarFile" class to examine the contents of the JAR file (step 804), i.e., to enumerate the entries in the JAR file. A determination is made as to whether or not one of the entries in the JAR file is a ".properties" file (step 806). If so, then a list of ".properties" files are processed in a loop.

The next ".properties" entry from the JAR file is retrieved (step 808), and the string values within the file are translated and/or localized (step 810). A new file name is obtained (step 812), either through input from the user of the inspection utility or by automatically generating the new file name; preferably, the new file name adheres to the naming conventions for Java™ resource bundles. The translated and/or localized strings are stored in a new ".properties" file with the specified file name (step 814), thereby completing the processing for the original ".properties" file from the original JAR file. A determination is then made as to whether or not there is another ".properties" file that has not yet been processed (step 816), and if so, then the process branches back to step 808 to obtain another ".properties" file from the JAR file.

If there is not another ".properties" file in the JAR file at step 816, or if there were no ".properties" files in the JAR file at step 806, then a determination is made as to whether or not there is a ".class" file in the original JAR file (step 818). If so, then the process branches to the steps shown in FIG. 8B. If not, then any newly generated files containing translated/localized strings are archived into a modified JAR file (step 820), thereby completing the process of localizing a Java™ JAR file. The previous copy of the JAR file may be modified, or alternatively, a newly generated JAR file may be created.

Referring to FIG. 8B, which branches from step 818 in FIG. 8A, the "JarFile" class can be used to extract a list of ".class" files from the JAR file (step 832), i.e., to enumerate the ".class" entries in the JAR file; alternatively, a list of the entries in the JAR file was previously saved at step 804, and the saved list is used to determine the ".class" entries. These ".class" entries are then processed in a loop; a "next" class file is taken from the list and processed as the "current" class file (step 834). At this point, the utility does not know what classes are contained within the ".class" file.

The utility then "inspects" the ".class" entry to check if it contains a resource bundle by attempting to load the class using the "ResourceBundle.getBundle( )" method (step 840). A determination is made as to whether or not the class is a resource bundle, i.e., whether it extends the "ListResourceBundle" class (step 842). If so, then a resource bundle is present, and the inspection utility extracts its objects, which are assumed to comprise string values. All of the keys within the resource bundle can be obtained (step 844), and then all of the objects that correspond to those keys can be obtained (step 846). The objects, i.e., string values, are translated/localized (step 848) by a user of the utility, who then supplies a new name for a ".java" file containing the new resource bundle (step 850) into which the translated (and possibly untranslated if not all strings are translated) strings are stored (step 852). Alternatively, a new name can be suggested or automatically generated that is similar to the name of the original resource bundle yet follows the standard naming conventions for Java™ resource bundles.

After processing this resource bundle, a determination is made as to whether or not there is another ".class" entry to be processed (step 854); if so, then the process branches to step 834 to retrieve and examine another ".class" entry. Otherwise, the new ".java" files are compiled into ".class" files (step 856), and the process branches back to step 820 in Figure A so that the new ".class" file(s) can be archived into a modified JAR file, thereby completing the process.

The advantages of the present invention should be apparent in view of the detailed description of the invention that is provided above. In the prior art, customization, localization, or internationalization of a Java™ application required the Java™ source files for the application to be present in order to allow a translator to create locale-sensitive strings for the application. However, Java™ applications are typically transmitted or transported in the JAR file format, which is then loadable and executable within a Java™ runtime environment. Hence, the source files are typically not present when a user is operating the application. If the application is being used in a region in which the application was not intended to be used or for which a localized version of the application has not been created, then it is inconvenient and possibly difficult for the users of the application to operate the application, particularly if the strings that are presented within a graphical user interface are unintelligible to a user who does not know the language of the strings.

More specifically, a Java™ application might be sold within a given region or market with a set of resource bundles for those regions, and the company that sells the application might be expected to support the application in those regions. However, the company might not create localized resource bundles for those regions or markets in which the company does not expect to sell the application or support the application.

The present invention recognizes that standard Java™ JAR files can be "inspected" to discover whether the JAR file contains any resource bundles, which are themselves classes, and to discover what objects, i.e., strings, are contained within a given resource bundle. After obtaining all of the key/value pairs from a resource bundle, a new localized version of the resource bundle can be created and then placed back into the original copy of the JAR file or into a newly generated copy of the JAR file.

A single utility could be provided in which the utility extracts a set of strings from the resource bundle and presents them to a user for translation, after which the translated strings are placed back into the JAR file. This form of utility would be appropriate for a scenario in which the manipulator of the JAR file has the ability to perform the translation operation.

Assuming that a third-party company has appropriate copyright and other permissions from the originator of the Java™ application to act as a value-added reseller, the third-party company could generate and support multiple localized versions of an application using the above-described utility. In this manner, it would not be necessary of the developer of the application to release its original source files to the third-party company.

In a slightly different scenario, the third-party company might not have the linguistic expertise to perform the actual translation of the strings. In this case, the third-party company could use the inspection utility of the present invention to extract the necessary resource bundle (or resource bundles) and place them into an appropriate source file (or source files), and the new source file could be sent to a linguistic expert, who returns a translated version of the source file. The third party could then archive the new localized resource bundle into a modified JAR file for distribution. In most cases, even if the original Java™ application has multiple pre-existing resource bundles, it would probably be necessary to extract only a single resource bundle, and multiple localized versions could be created from the single resource bundle. For example, a single English resource bundle could be sent to multiple linguistic experts for translation into multiple languages, and multiple resource bundles for these languages could be stored into the modified JAR file.

It should be noted that a secure JAR file typically has one or more digital signatures associated with it to ensure that the JAR file has remained uncorrupted or unchanged since it was created. It may be assumed that a third-party vendor obtains the proper authorization to create a modified JAR file that is properly signed such that it would be accepted as secure by any customers that desire to execute the application.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for generating a locale-sensitive version of a Java™ application, the method comprising:
    determining whether a JAR (Java™ Archive) file comprises a first resource bundle, wherein the resource bundle comprises a plurality of key-value pairs, wherein a key-value pair has a key that identifies a text string;
    in response to determining that the JAR file comprises a first resource bundle, retrieving a set of text strings from the first resource bundle;
    receiving a set of translated text strings corresponding to a subset of the set of text strings from the first resource bundle;
    generating a second resource bundle comprising the set of translated text strings; and
    storing the second resource bundle in the JAR file.

2. The method of claim 1, wherein the step of determining whether a JAR file comprises a first resource bundle further comprises:
    obtaining a list of entries in the JAR file; and
    determining whether the JAR file comprises at least one Java™ ".class" entry.

3. The method of claim 2 further comprising:
    in response to a determination that the JAR file comprises at least one Java™ ".class" entry, attempting to load a class associated with the Java™ ".class" entry using the "ResourceBundle.getBundle( )" method; and
    in response to a successful load of the class associated with the Java™ ".class" entry, providing a positive indication for the determination that the JAR file comprises a first resource bundle.

4. The method of claim 1, wherein the step of determining whether a JAR file comprises a first resource bundle further comprises:
    obtaining a list of entries in the JAR file; and
    determining whether the JAR file comprises at least one Java™ ".properties" entry.

5. The method of claim 4 further comprising:
    in response to a determination that the JAR file comprises at least one Java™ ".properties" entry, providing a positive indication for the determination that the JAR file comprises a first resource bundle.

6. The method of claim 1 further comprising:
    presenting an untranslated text string from the set of text strings from the first resource bundle within an editable field within a window; and
    receiving user input for a translated text string corresponding to the untranslated text string.

7. The method of claim 1 further comprising:
    naming the second resource bundle in accordance with a language for the translated text strings and naming convention rules for resource bundles.

8. The method of claim 1 further comprising:
    extracting a copy of the first resource bundle from the JAR file; and
    storing the copy of the first resource bundle in an external file.

9. An apparatus for generating a locale-sensitive version of a Java™ application, the apparatus comprising:
    means for determining whether a JAR (Java™ Archive) file comprises a first resource bundle, wherein the resource bundle comprises a plurality of key-value pairs, wherein a key-value pair has a key that identifies a text string;
    means for retrieving a set of text strings from the first resource bundle in response to determining that the JAR file comprises a first resource bundle;
    means for receiving a set of translated text strings corresponding to a subset of the set of text strings from the first resource bundle;
    means for generating a second resource bundle comprising the set of translated text strings; and
    means for storing the second resource bundle in the JAR file.

10. The apparatus of claim 9, wherein the means for determining whether a JAR file comprises a first resource bundle further comprises:

means for obtaining a list of entries in the JAR file; and
means for determining whether the JAR file comprises at least one Java™ ".class" entry.

11. The apparatus of claim 10 further comprising:
means for attempting to load a class associated with the Java™ ".class" entry using the "ResourceBundle.getBundle( )" method in response to a determination that the JAR file comprises at least one Java™ ".class" entry; and
means for providing a positive indication for the determination that the JAR file comprises a first resource bundle in response to a successful load of the class associated with the Java™ ".class" entry.

12. The apparatus of claim 9, wherein the means for determining whether a JAR file comprises a first resource bundle further comprises:
means for obtaining a list of entries in the JAR file; and
means for determining whether the JAR file comprises at least one Java™ ".properties" entry.

13. The apparatus of claim 12 further comprising:
means for providing a positive indication for the determination that the JAR file comprises a first resource bundle in response to a determination that the JAR file comprises at least one Java™ ".properties" entry.

14. The apparatus of claim 9 further comprising:
means for presenting an untranslated text string from the set of text strings from the first resource bundle within an editable field within a window; and
means for receiving user input for a translated text string corresponding to the untranslated text string.

15. The apparatus of claim 9 further comprising:
means for naming the second resource bundle in accordance with a language for the translated text strings and naming convention rules for resource bundles.

16. The apparatus of claim 9 further comprising:
means for extracting a copy of the first resource bundle from the JAR file; and
means for storing the copy of the first resource bundle in an external file.

17. A computer program product in a computer-readable medium for use in a data processing system for generating a locale-sensitive version of a Java™ application, the computer program product comprising:
instructions for determining whether a JAR (Java™ Archive) file comprises a first resource bundle, wherein the resource bundle comprises a plurality of key-value pairs, wherein a key-value pair has a key that identifies a text string;
instructions for retrieving a set of text strings from the first resource bundle in response to determining that the JAR file comprises a first resource bundle;
instructions for receiving a set of translated text strings corresponding to a subset of the set of text strings from the first resource bundle;
instructions for generating a second resource bundle comprising the set of translated text strings; and
instructions for storing the second resource bundle in the JAR file.

18. The computer program product of claim 17, wherein the instructions for determining whether a JAR file comprises a first resource bundle further comprises:
instructions for obtaining a list of entries in the JAR file; and
instructions for determining whether the JAR file comprises at least one Java™ ".class" entry.

19. The computer program product of claim 18 further comprising:
instructions for attempting to load a class associated with the Java™ ".class" entry using the "ResourceBundle.getBundle( )" method in response to a determination that the JAR file comprises at least one Java™ ".class" entry; and
instructions for providing a positive indication for the determination that the JAR file comprises a first resource bundle in response to a successful load of the class associated with the Java™ ".class" entry.

20. The computer program product of claim 17, wherein the instructions for determining whether a JAR file comprises a first resource bundle further comprises:
instructions for obtaining a list of entries in the JAR file; and
instructions for determining whether the JAR file comprises at least one Java™ ".properties" entry.

21. The computer program product of claim 20 further comprising:
instructions for providing a positive indication for the determination that the JAR file comprises a first resource bundle in response to a determination that the JAR file comprises at least one Java™ ".properties" entry.

22. The computer program product of claim 17 further comprising:
instructions for presenting an untranslated text string from the set of text strings from the first resource bundle within an editable field within a window; and
instructions for receiving user input for a translated text string corresponding to the untranslated text string.

23. The computer program product of claim 17 further comprising:
instructions for naming the second resource bundle in accordance with a language for the translated text strings and naming convention rules for resource bundles.

24. The computer program product of claim 17 further comprising:
instructions for extracting a copy of the first resource bundle from the JAR file; and
instructions for storing the copy of the first resource bundle in an external file.

* * * * *